United States Patent [19]

Pedroia

[11] 4,401,329
[45] Aug. 30, 1983

[54] MACHINE FOR AUTOMATICALLY TYING KNOTS IN MEAT STUFFED IN A CASING BY MEANS OF A STRING

[76] Inventor: Luigi Pedroia, Via Cadogno 1, 6648 Minusio, Switzerland

[21] Appl. No.: 259,502

[22] Filed: May 1, 1981

[30] Foreign Application Priority Data

May 8, 1980 [CH] Switzerland .................. 3586/80

[51] Int. Cl.³ .................. A22C 11/12; B65H 69/04
[52] U.S. Cl. .................. 289/18.1; 17/34; 242/46.2
[58] Field of Search .................. 289/1.5, 2, 18.1; 242/46.2; 17/33, 34

[56] References Cited

U.S. PATENT DOCUMENTS

| | | | |
|---|---|---|---|
| 2,462,957 | 3/1949 | Gunn | 289/2 X |
| 3,318,623 | 5/1967 | Barroso | 289/1.5 |
| 3,473,292 | 10/1969 | Gaudlitz | 289/18.1 X |
| 4,188,053 | 2/1980 | Pujol | 289/18.1 |
| 4,313,630 | 2/1982 | Barroso | 289/2 X |

FOREIGN PATENT DOCUMENTS

| | | | |
|---|---|---|---|
| 1507973 | 1/1970 | Fed. Rep. of Germany | 289/18.1 |
| 579351 | 9/1976 | Switzerland | |
| 587610 | 5/1977 | Switzerland | |
| 142166 | 4/1961 | U.S.S.R. | 289/2 |

Primary Examiner—Louis Rimrodt
Attorney, Agent, or Firm—Young & Thompson

[57] ABSTRACT

A machine for automatically tying knots in meat stuffed in a casing by means of a string, comprises an assembly for squeezing the casing over a given extent prior to tying, and a spool unit comprising a spool carrying a supply of string. The spool is rotatably enclosed in a housing which moves only parallel to the axis of feed of the casing. A mechanism having an opening for the passage therethrough of the casing and a hook-shaped member for the passage therethrough of the spool unit, carries elements for temporarily supporting the string over a polygonal path, as well as a relatively axially movable element for detaching the string from the support elements. The use of the mechanism having the hook-shaped component and rotatable to wind the string around the casing, in combination with the spool unit for linearly dispensing the string, permits tying in a spiral direction and also simplifies the design of the machine.

5 Claims, 9 Drawing Figures

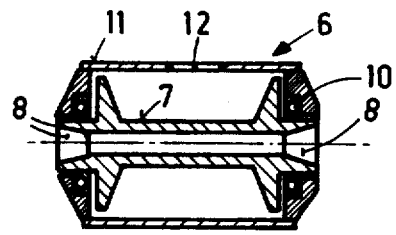
Fig.5
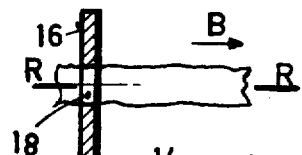
Fig.4
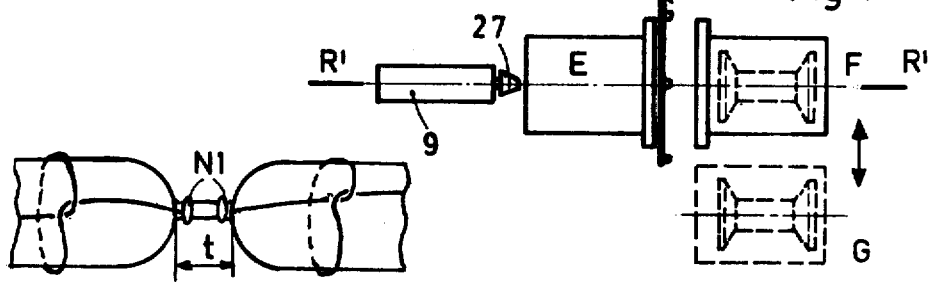
Fig.6
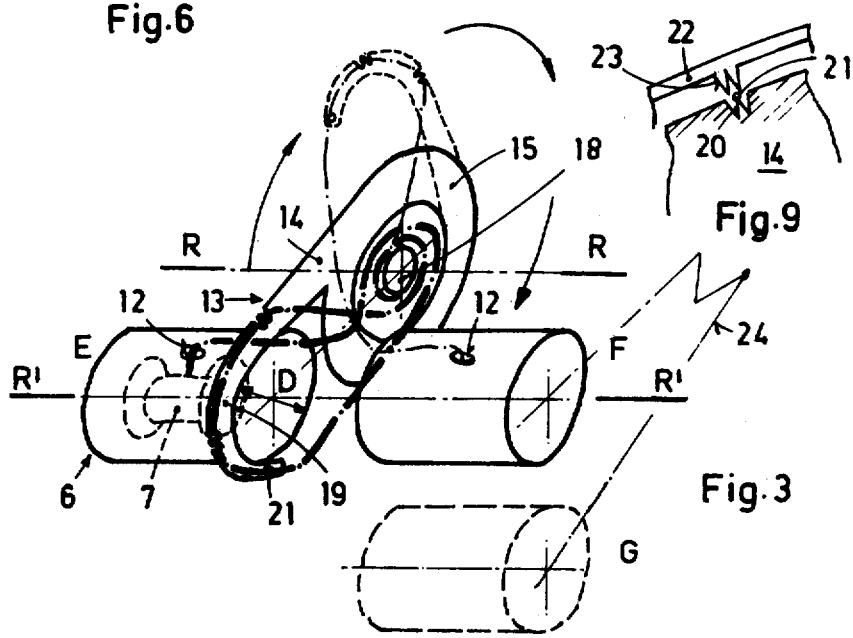
Fig.9
Fig.3

MACHINE FOR AUTOMATICALLY TYING KNOTS IN MEAT STUFFED IN A CASING BY MEANS OF A STRING

The present invention relates to a machine for automatically tying knots in meat stuffed in a casing by means of a string. The casing can be of any conventional material used for this purpose, including lengths of intestines.

Such a machine is the subject of my copending U.S. application Ser. No. 251,780, filed Apr. 7, 1981. In such known machines, in order to tie the actual knot in the casing, the spool or bobbin on which the string is wound makes at least one rotation around the advacing section of casing in a plane perpendicular to the casing, the subsequent length of string being disposed to extend parallel to the axis of the casing between successive knots.

By contrast, in the present invention, the knot is tied through a translatory, not a rotative, motion of the spool. Furthermore, the path followed by the string between successive knots has a helical shape.

In addition to simplifying the design of the machine, this latter form of tying permits a kind of knotting which is very close to knotting by hand, and further results in the string adhering perfectly to the casing.

The machine embodying the invention is characterized in that it comprises a mechanism of known construction adapted to squeeze the casing over a certain extent in order to remove the meat stuffed therein prior to tying the knot, a spool assembly consisting of a spool carrying the string supply which, in turn, is enclosed in a housing which is movable axially parallel with the axis of feed of the casing, and a rotatably mounted mechanism having an opening for the passage of the casing on its way to being tied, and a hook-shaped part through which passes the spool assembly, said mechanism carrying elements for temporarily supporting a length of string over a polygonal path, as well as an element which moves axially to detach said length of string from said supporting elements.

A more complete understanding may be gained from the attached drawings, in which an illustrative embodiment of the invention is shown, and wherein:

FIG. 3 is a schematic perspective view of the various terminal positions of the spool and of the path followed by the string during a tying operation;

FIG. 4 is a schematic front view of FIG. 3;

FIG. 5 is a cross-sectional view along the axis of the spool carrying the string supply;

FIG. 6 is a schematic view of a section of casing being tied with two successive knots on the parts adjacent to, instead of on, the section from which the sausage has been removed;

FIG. 9 is a schematic view, on a larger scale, of the temporary blocking of the string while it is being tied.

Figure 1:
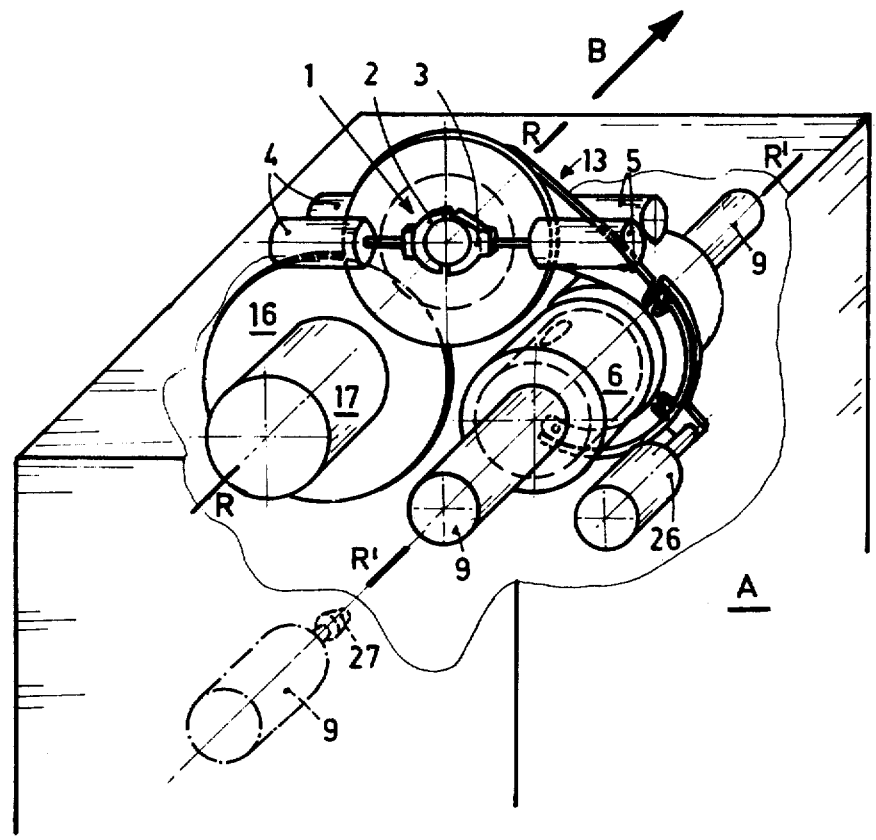
FIG. 1 is a schematic perspective view of the arrangement of the essential elements of the machine taken from the side entered by the casing.
Figure 7:
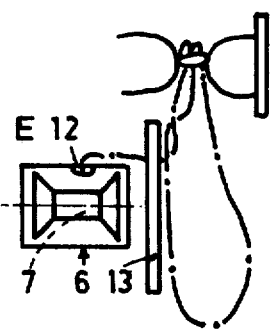
FIGS. 7 and 8 are schematic views of two successive stages of the tying operation, showing the translatory motion of the spool and the path followed by the length of string unwound therefrom.

The machine according to the invention comprises a frame A in which are arranged the various members for the tying operation, namely: an assembly 1 of known construction adapted to squeeze the casing along a given stretch "t" in order to remove the sausage, to prepare for the tying of one or more knots. The assembly 1 comprises two jaws 2,3 (FIGS. 1 and 2), the V-shaped ends of which act against each other and are reciprocated by mechanical means or with the aid of pneumatic pistons 4,5; a spool assembly 6 carrying the string supply and comprising the spool 7 proper which, in order to have a very low moment of inertia is made of a light material such as, for example, aluminum or anodized aluminum alloy, or synthetic resin. A conical hole 8 is drilled at the center thereof in order to rotate it by means of a motor 9, the shaft of which is equipped with a conical friction clutch 27.

With the interposition of roller bearings 10 the spool 7 is rotatably mounted within a housing 11 which, in turn, is guided by appropriate means (not shown) to permit the spool assembly to have translatory motion only, and preventing said housing from having any rotative motion. A hole 12 is drilled in the housing 11 from which the string issues as it unwinds. To be more precise, as the string unwinds from the spool, it reaches the casing from a single opening which can have only a translatory motion extending substantially parallel to the direction of feed of the casing. A mechanism 13 is adapted to move and to guide the string around and along the section of squeezed casing in order to place the string on a path having the form of a polygon, allowing the spool to pass therethrough with the final insertion and passing of the spool into the polygon and subsequent pulling of the string due to the "spool's rotation about its axis so that a knot is formed and tightened around said section of casing, with the issuing string adhering to the casing.

The mechanism 13, which is mounted so as to rotate about the axis of feed R—R of the casing, comprises a structure 14 having an elongated and substantially flat shape (FIGS. 1 and 3). In its first end portion 15, which is driven in rotation by a rotary head 16 rotated by a motor 17, there is provided an opening 18 through which passes the stuffed casing, while the second end portion 19 of said mechanism has the shape of a curved hook. Three double-V-shaped recesses 20 are provided therealong, from the central tip of a pair of which there protrudes a peg 21 parallel to and in the direction of feed of the casing to support temporarily a certain length of string needed to form the polygon.

An element 22 having a pair of teeth 23, also V-shaped and complementary to and penetrating into the V-shaped recesses 20, is also provided with a pneumatic motor 26 to move it parallel to the axis of linear forward movement of the spool. Said element 22 serves to push the string or polygon of string from said supporting pegs 21, placing it on the casing to form between two casing sections an intermediate knot or two knots N1 spaced a distance "t" from one another.

The width D of the hook opening is greater than the diameter of the spool assembly so as to enable the latter to move from its final end position E to assume a coaxial starting end position F for the next tying operation.

Figure 2:
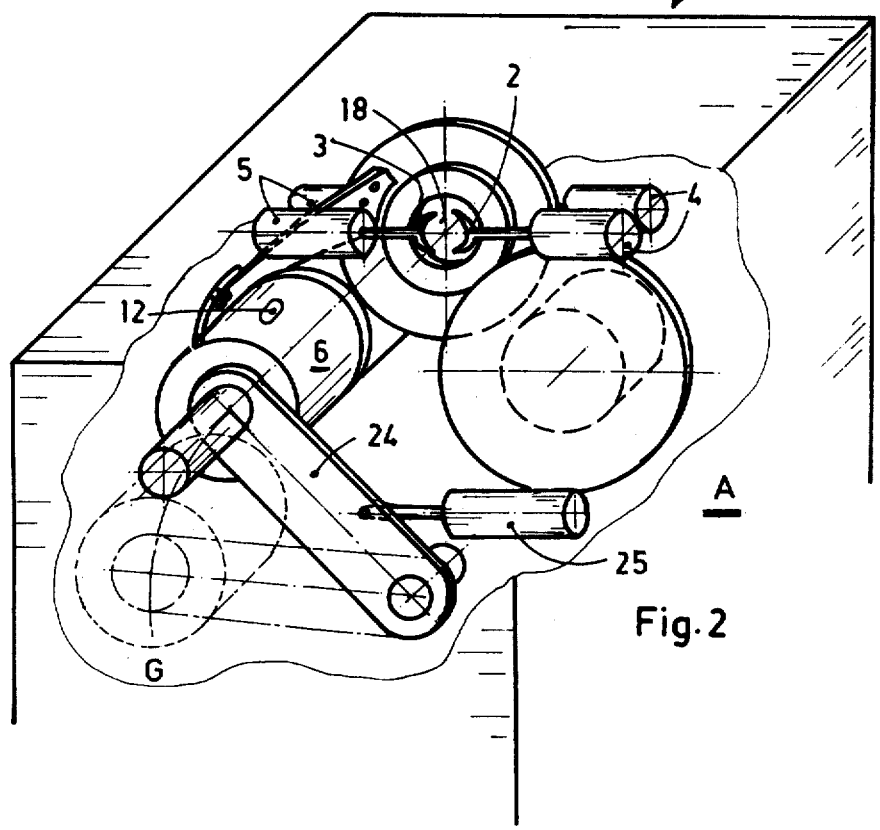
FIG. 2 is a view of the same elements from the side opposite FIG. 1.

As is readily apparent from FIGS. 3, 4, 7 and 8, in order to complete the final tying of the knot, the spool assembly 6 is moved from its starting end position F downstream of said mechanism 13 to a lower position G indicated by the broken lines in FIGS. 2, 3, 4 as a result of the angular motion imparted thereto by a lever 24 having a pneumatic piston 25 with the object of enabling the pegs 21 to catch the string before said mechanism makes it second rotative motion. Preferably, a pneumatic motor 17 is provided to rotate said mechanism 13.

The surplus unwound string is rewound by the abovementioned motor with the interposition of a friction clutch (also not shown).

The machine operates as follows:

First, the casing is squeezed by means of the jaws 2, 3 (FIGS. 1 and 2) over a stretch "t", the length of which depends on whether a single central knot or two spaced-apart knots N1 are to be tied. To this end, pneumatic pistons 4,5 are employed (FIGS. 1 and 2). During this operation, the spool assembly 6 is upstream of the rotary mechanism 13 viewed from the direction of feed of the casing (FIG. 1).

Figure 8:
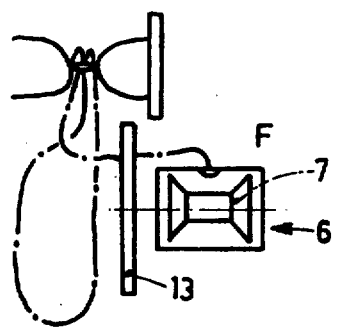

After squeezing the casing along the stretch "t", the mechanism 13 and, thereby, the reserve or polygon of string already placed and held by the pressure exerted by the teeth 23 of the element 22 against the pegs 21 of the mechanism 13 and after the motion of the spool assembly upstream of the rotary head 16, makes a first rotative motion with respect to the axis R—R, accomplishing the first stage of the tying operation (FIG. 8).

Upon completion of the first rotation of the mechanism 13 about the axis R—R and by means of a system consisting of lever 24 and pneumatic piston 25 the spool assembly 6 moves downward (FIGS. 2, 3 and 4) to assume the position G indicated by the broken line in order to allow said mechanism to unwind from the spool the length of string needed to form the knot. Then, said assembly 6 returns to its previous position F coaxial with the final position of the spool E, after which said mechanism 13 will make a second and final rotative motion (FIGS. 3 and 4). Finally, the spool assembly 6 moves to its starting position in order to accomplish the second stage of the tying operation which consists in pulling the string to form the knot. The knot is then tightened by rotating the spool in the direction opposite to the direction in which the string is unwound and the surplus length of string is rewound.

As mentioned above, the rotative motion is imparted to the mechanism 13 by a motor 17 having a rotary head 16, while the rotative motion of the spool assembly 6 is brought about by, preferably, two cone clutches, one of which is shown at 27 in FIG. 1. Said clutches, driven by an electric, pneumatic, or other type of motor 9 with the interposition of a friction clutch are moved axially via pneumatic means.

Hydraulic, electric or mechanical devices may also be employed instead of pneumatic devices.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A machine for automatically tying knots in meat stuffied in a casing by means of a string, comprising means to squeeze the casing over a given stretch in order to remove the sausage therefrom prior to tying, a spool assembly comprising a spool carrying a supply of string, a housing for said spool which is movable parallel to the axis of feed of the casing, a rotatably mounted mechanism having an opening for the passage of the casing on its way to being tied and a hook-shaped portion for the passage of the spool assembly therethrough, aid mechanism having memebers for temporarily supporting a length of string over a polygonal path, and an axially moving element for detaching said length of string from said supporting members, in which the knot is tied by movement of the spool to various positions, namely:

a final position (E) of the spool assembly upstream of said mechanism which rotates in order to form the polygon of string;

a position (F) of the spool assembly downstream of said mechanism to allow the latter to make a first rotative and tying motion;

a position (G) rotated angularly and downwardly from position (F) to allow said mechanism to unwind, through a rotative motion, the length of string required for the tying, followed by its return to the previous position (F), finally assuming its final position (E) downstream of said mechanism in order to achieve a second tying stage, comprised by pulling the string so as to form the knot.

2. The machine as defined in claim 1, in which said spool rotates about its axis parallel to the axis of feed of the casing, said housing enclosing said casing being non-rotatable and having a hole through which issues the length of string.

3. The machine as defined in claim 1, said mechanism being rotatably mounted in a plane substantially perpendicular to the axis of feed of the casing.

4. The machine as defined in claim 3, in which along the external edge of said hook-shaped portion of said mechanism there are double-V notches from the central tip of each of which there protrudes a peg parallel to the direction of feed of the casing, said pegs comprising said temporary support means.

5. The machine as defined in claim 4, in which said axially moving element, in order to detach the string from said pegs and to place it on the casing, comprises two adjacent profiled V-shaped projections for pushing the string off said pegs and removing the string from said mechanism, and means to move said element axially.

* * * * *